United States Patent
Lin et al.

(10) Patent No.: US 7,808,558 B2
(45) Date of Patent: *Oct. 5, 2010

(54) ADAPTIVE COLOR TRANSIENT IMPROVEMENT

(75) Inventors: Peng Lin, Pleasanton, CA (US); Yeong-Taeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 732 days.

This patent is subject to a terminal disclaimer.

(21) Appl. No.: 11/799,345

(22) Filed: Apr. 30, 2007

(65) Prior Publication Data

US 2007/0200958 A1    Aug. 30, 2007

Related U.S. Application Data

(63) Continuation of application No. 10/345,552, filed on Jan. 16, 2003, now Pat. No. 7,271,851.

(51) Int. Cl.
   H04N 5/00   (2006.01)
   H04N 5/21   (2006.01)
   H04N 9/68   (2006.01)
   G06K 9/20   (2006.01)
   G06K 9/40   (2006.01)

(52) U.S. Cl. .................. 348/631; 348/606; 348/610; 348/612; 348/621; 348/624; 348/627; 348/630; 348/645; 382/261; 382/266

(58) Field of Classification Search .......... None
See application file for complete search history.

(56) References Cited

U.S. PATENT DOCUMENTS

| | | | |
|---|---|---|---|
| 4,935,806 A | 6/1990 | Rabii | 348/606 |
| 5,196,736 A | 3/1993 | Doornhein et al. | 327/170 |
| 5,225,910 A | 7/1993 | Sugimori et al. | 348/613 |
| 5,369,446 A | 11/1994 | Parker et al. | 348/625 |
| 5,668,606 A | 9/1997 | Okamoto et al. | 348/625 |
| 5,920,357 A | 7/1999 | Ohara | |
| 5,930,402 A | 7/1999 | Kim | 382/274 |

(Continued)

FOREIGN PATENT DOCUMENTS

CN    1045209    9/1990

(Continued)

OTHER PUBLICATIONS

U.S. Non-Final Office Action for U.S. Appl. No. 10/345,552 mailed Oct. 19, 2005.

(Continued)

*Primary Examiner*—Brian P Yenke
(74) *Attorney, Agent, or Firm*—Kenneth L. Sherman, Esq.; Michael Zarrabian, Esq.; Myers Andras Sherman LLP

(57) ABSTRACT

A superior Color Transient Improvement technique is adaptive to the local image features, so that more natural color edge transition improvement can be accomplished. A gain control function is provided that depends on the local image feature so that different regions of the image can be treated differently. Further, a correction signal is controlled in such a way (by the local image feature) that neither undershoot nor overshoot occurs, eliminating the need for post-processing for undershoot/overshoot removal.

8 Claims, 4 Drawing Sheets

U.S. PATENT DOCUMENTS

| | | | |
|---|---|---|---|
| 5,936,682 A | 8/1999 | Thomas et al. | 348/625 |
| 6,094,205 A | 7/2000 | Jaspers | 348/625 |
| 6,429,875 B1 * | 8/2002 | Pettigrew et al. | 345/591 |
| 6,571,224 B1 | 5/2003 | He et al. | 706/8 |
| 6,600,517 B1 | 7/2003 | He et al. | 348/625 |
| 6,611,296 B1 | 8/2003 | Nieuwenhuizen et al. | 348/625 |
| 6,657,677 B1 | 12/2003 | He et al. | 348/625 |
| 6,690,429 B1 | 2/2004 | Kim | 348/625 |
| 6,717,622 B2 | 4/2004 | Lan | 348/625 |
| 6,795,083 B2 | 9/2004 | Bao et al. | 345/589 |
| 7,130,483 B2 * | 10/2006 | Kim | 382/266 |
| 7,373,013 B2 * | 5/2008 | Anderson | 382/261 |
| 7,433,536 B2 * | 10/2008 | Kim | 382/266 |
| 7,532,255 B2 * | 5/2009 | Zhu | 348/631 |
| 7,545,976 B2 * | 6/2009 | Gondek et al. | 382/162 |
| 7,623,706 B1 * | 11/2009 | Maurer | 382/167 |
| 2002/0067862 A1 | 6/2002 | Kim | 382/266 |
| 2002/0140865 A1 | 10/2002 | Matsushita et al. | 348/631 |
| 2002/0191859 A1 | 12/2002 | Amano et al. | |
| 2003/0206245 A1 | 11/2003 | Lin et al. | 348/631 |

FOREIGN PATENT DOCUMENTS

| | | |
|---|---|---|
| WO | WO 02/056583 A3 | 7/2002 |

OTHER PUBLICATIONS

U.S. Final Office Action for U.S. Appl. No. 10/345,552 mailed Feb. 24, 2006.

U.S. Advisory Action for U.S. Appl. No. 10/345,552 mailed May 9, 2006.

U.S. Non-Final Office Action for U.S. Appl. No. 10/345,552 mailed Jul. 19, 2006.

U.S. Final Office Action for U.S. Appl. No. 10/345,552 mailed Jan. 17, 2007.

U.S. Advisory Action for U.S. Appl. No. 10/345,552 mailed Mar. 29, 2007.

U.S. Notice of Allowance for U.S. Appl. No. 10/345,552 mailed May 7, 2007.

* cited by examiner

ADAPTIVE COLOR TRANSIENT IMPROVEMENT

CROSS-REFERENCE TO RELATED APPLICATIONS

The present application is a continuation of U.S. patent application Ser. No. 10/345,552, filed Jan. 16, 2003, now U.S. Pat. No. 7,271,851 which is incorporated herein by reference in its entirety.

FIELD OF THE INVENTION

The present invention relates generally to image signal processing, and more particularly to enhancing sharpness of color transitions in color TV broadcasting.

BACKGROUND OF THE INVENTION

In color TV broadcasting standards, such as NTSC, PAL and SECAM, the transmitted signals include chrominance signals and luminance signals. In comparison to the luminance signal bandwidth, the chrominance signal bandwidth is rather narrow. The limited bandwidth of the chrominance signal produces relatively slow chrominance transitions, causing smeared color edges in the received/displayed images.

Different techniques have been used in attempts to enhance the sharpness of color transitions, such as those described in U.S. Pat. No. 4,935,806 and U.S. Pat. No. 5,920,357, known as "Color Transient Improvement" techniques. The basic steps in the Color Transient Improvement techniques are to add a "correction signal" (using a high-pass filter) to the original chrominance signals to restore the frequency components lost due to the limited bandwidth. This is followed by a post-processing to remove any undershoot and overshoot.

Typically, the "correction signal" is multiplied by a control parameter to control the overall gain. Existing techniques use a constant control parameter for an entire image, regardless of the variance in different regions of the image. However, this leads to unnatural appearance in some color edge areas of the image. As such, there has been a need to treat different regions of the image differently, and to also control the correction signal so that neither undershoot nor overshoot occurs, whereby post-processing for undershoot/overshoot removal is eliminated.

BRIEF SUMMARY OF THE INVENTION

The present invention addresses the above problems. An object of the present invention is to provide a superior Color Transient Improvement (CTI) technique which is adaptive to the local image features, so that more natural color edge transition improvement can be accomplished. In one embodiment, the present invention provides a gain control function that depends on the local image features so that different regions of the image can be treated differently. Further, a correction signal is controlled in such a way (using the local image features) that neither undershoot nor overshoot occurs, eliminating the need for post-processing for undershoot/overshoot removal.

An example CTI technique according to the present invention includes the steps of, first determining the second derivative of a smoothed version of the input chrominance signal. Then, a gain control function is constructed as a function of the second derivative. Unlike the conventional approaches, wherein a constant parameter is used for the entire image to control the enhancement gain, the present invention uses a control function which provides different gains for different image areas. In one version, the gain control function can range between 0 and 1, and varies with the local image feature that is characterized by the second derivative. Together with the sign of the second derivative, the gain control function determines how to correct slow color transitions.

A positive second derivative corresponds to a point on the color transient curve where the curve is "concave up". At that point, there is a "push" of the transient curve towards its local minimum. A negative second derivative corresponds to a point on the color transient curve where the curve is "concave down". At that point, there is a "push" of the transient curve towards its local maximum. The result of this procedure is a sharpened transient curve. The "push" is controlled by the gain control function and the local minimum and local maximum. Because the furthest a point on the transient curve can be pushed to, is the local minimum or local maximum, essentially no undershoot or overshoot occurs.

The aforementioned "push" mechanics is realized by adding a "correction signal" to the original signal. In conventional techniques, the added "correction signal" is a high frequency signal obtained by various high-pass filters. This approach usually causes undershoot or overshoot. According to the present invention, however, the "correction signal" is the distance between the original signal and its local minimum or maximum. This essentially guarantees that there is no undershoot nor overshoot, and the need for post-processing to remove undershoot/overshoot is eliminated.

The present invention further prevents noise accentuation. In the noisy image areas where there is no significant color transition, the second derivatives of the smoothed chrominance signals are very close to zero. Therefore, the gain control function, which is a function of the second derivative, is very close to zero in such areas. As such, the signals are barely changed in these areas, wherein the existing noise is not accentuated.

BRIEF DESCRIPTION OF THE DRAWINGS

These and other features, aspects and advantages of the present invention will become understood with reference to the following description, appended claims and accompanying figures where:

DETAILED DESCRIPTION OF THE INVENTION

Overview

With reference to the drawings, an embodiment of a superior Color Transient Improvement (CTI) technique according to the present invention is described. Such a CTI technique is adaptive to the local image feature, so that more natural color edge transition improvement can be accomplished. In one example, a gain control function is provided which depends on the local image feature so that different regions of the image can be treated differently. Further, a correction signal is controlled in such a way (by the local image feature) that neither undershoot nor overshoot occurs, eliminating the need for post-processing for undershoot/overshoot removal.

An example CTI technique according to the present invention includes the steps of, first determining the second derivative of a smoothed version of the input chrominance signal. Then, a gain control function is constructed as a function of the second derivative. Unlike the conventional approaches, the present invention uses a control function which provides different gains for different image areas.

In one example, the gain control function can range between 0 and 1, and varies with the local image feature that is characterized by the second derivative. Together with the sign of the second derivative, the gain control function determines how to correct slow color transitions.

A positive second derivative corresponds to a point on the color transient curve where the curve is "concave up". At that point, there is a "push" of the transient curve towards its local minimum. A negative second derivative corresponds to a point on the color transient curve where the curve is "concave down". At that point, there is a "push" of the transient curve towards its local maximum. The result of this procedure is a sharpened transient curve. The "push" is controlled by the gain control function and the local minimum and local maximum. Because the furthest a point on the transient curve can be pushed to, is the local minimum or local maximum, essentially no undershoot or overshoot occurs.

The aforementioned "push" mechanics is realized by adding a "correction signal" to the original signal. In conventional techniques, the added "correction signal" is a high frequency signal obtained by various high-pass filters. This approach usually causes undershoot or overshoot. According to the present invention, however, the "correction signal" is based on the distance between the original signal and its local minimum or maximum. This essentially guarantees that there is no undershoot nor overshoot, and the need for post-processing to remove undershoot/overshoot is eliminated.

Example Implementation

Figure 1:
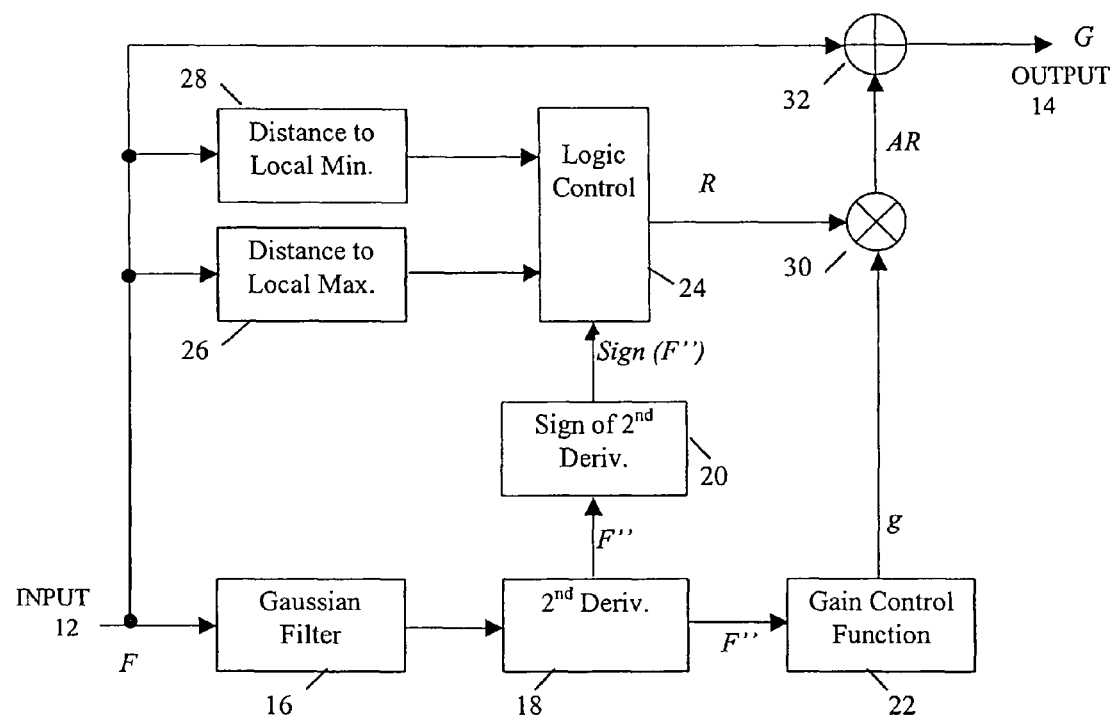
FIG. 1 shows an example block diagram of an embodiment of a Color Transient Improvement logic according to the present invention.

An example logic arrangement or system 10, embodying aspects of the present invention, is shown in the block diagram of FIG. 1. An input to the system 10 is the chrominance signal 12 (U or V), and an output is the corresponding enhanced chrominance signal 14 with steep color edges. For simplicity of description herein, the input chrominance signal 12 is denoted as F, which refers to either U or V, and the corresponding output chrominance signal 14 is denoted as G. The input chrominance signal F is assumed to be a digital signal. If the incoming signals are analog waveforms, they are first converted into sampled digital signals (e.g., using a analog-to-digital converter/sampler, not shown).

The input signal F is supplied to a low-pass filter 16, such as a "Gaussian filter". Although other types of low-pass filters can be used, a "Gaussian filter" is preferred due to its superior smoothness properties. A 7-tap filter as an approximation of the "Gaussian filter" with standard deviation 1 is used as the low-pass filter 16 to smooth the input signal F. The output of the "Gaussian filter" is supplied to a second derivative calculator ("2$^{nd}$ Deriv.") 18 to determine the second derivative F''.

Because the second derivative F'' is calculated from a smoothed version of the input signal F, the second derivative F'' is less sensitive to the noise. Further, the second derivative F'' is a more accurate reflection of the geometric properties (i.e., concave up or concave down) of the transition curve of the input signal F. Instead of the second derivative, other measures (e.g., other derivatives and/or combinations thereof) indicating geometric properties of the signal, can also be used. The second derivative F'' is preferably approximated in the second derivative calculator 18 by a band-pass filter with the filter coefficients (1, 0, −2, 0, 1).

The output F'' of the second derivative calculator 18, is supplied to both a "sign of second derivative" unit 20 and a "gain control function" unit 22. The "sign of second derivative" unit 20 produces the sign of the second derivative F'', denoted as sign(F''). As such:

If F''>0, then sign(F'')=1;

If F''<0, then sign(F'')=−1;

If F''=0, then sign(F'')=0.

Although in the example herein the sign of the second derivative is used, in other embodiments, a comparison of the value of the second derivative to one or more threshold values can be used.

The sign of the second derivative is supplied to a "logic control unit" 24, which essentially determines whether the transition curve will be "pushed" upward or downward, as described in more detail further below.

The "gain control function" unit 22 first computes the absolute value of the second derivative, |F''|, and then constructs a gain control function g. The basic requirements of the gain control function g are that: (i) It is a continuous (or smooth) increasing function ranging between 0 and 1, (ii) It is close to 0 for small absolute value of the second derivative F'' and is close to 1 for larger absolute value of the second derivative |F''|. An example gain control function can be represented as:

$$g = \frac{|F''|}{C + |F''|}$$

wherein F'' is the second derivative calculated from the smoothed version of the input signal F, and C>0 is a fixed constant. C determines the strength of the function g. An example range for C is between about 0 and 3.

Figure 2:
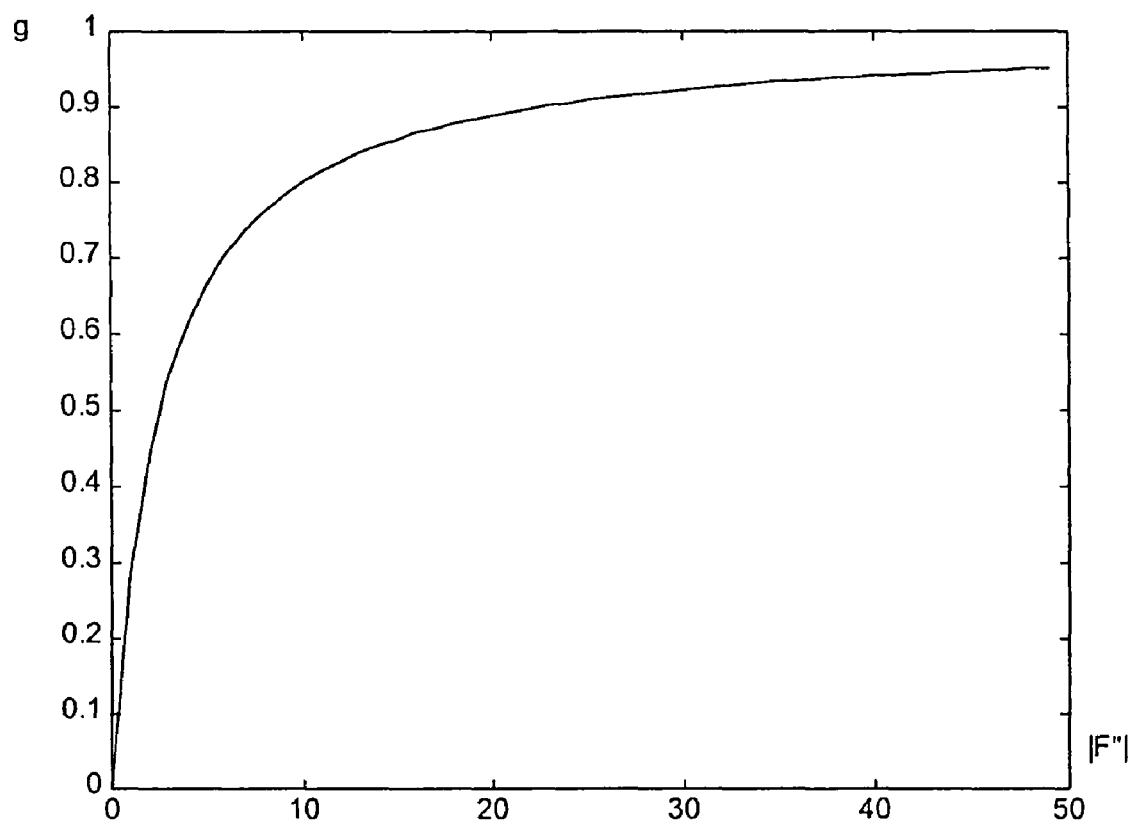
FIG. 2 is an example plot of a gain control function for the logic in FIG. 1.

FIG. 2 shows an example plot of the above gain control function g with C=2.5, wherein the dimensions on the horizontal axis in FIG. 2 is same as |F''|. The gain control function g provides different gains for different image areas, making the color transient enhancement processing adaptive to local image feature, according to the present invention. In a flat area or featureless noise area, because the second derivative of the smoothed image, F'', equals to or approximately equals to zero, the gain control function g essentially provides no gain. In an area where color transition occurs, the absolute value of the second derivative of the smoothed image, |F''|, is larger, wherein the gain control function g returns a larger value, whereby the color transition is enhanced.

Referring back to FIG. 1, in order to generate a correction signal R, the input signal F is also supplied to a "distance to local minimum" unit 26 and to a "distance to local maximum" unit 28. The "distance to local minimum" unit 26 first computes the local minimum $F_{min}$ by searching the interval of radius r centered at the current signal sample position. The radius r can be set to e.g. either to 3 or 4. After finding the local minimum, the "distance to local minimum" unit 26 then computes the distance between the input signal F and the local minimum $F_{min}$. Wherein, the output of the "distance to local minimum" unit 26 is the difference $F_{min}$−F.

Similarly, the "distance to local maximum" unit 28 first computes the local maximum $F_{max}$ by searching the interval of radius r centered at the current signal sample position, and then computes the distance between the input signal F and the local maximum $F_{max}$. Wherein, the output of the "distance to local maximum" unit 28 is the difference $F_{max}-F$.

Both the output of the "distance to local minimum" unit 26, $F_{min}-F$, and the output of the "distance to local maximum" unit 28, $F_{max}-F$, are supplied to the "logic control" unit 24. As described, the "logic control" unit 24 also uses the output of the "sign of second derivative" unit 20, which is the sign of the second derivative, sign(F"). Based on the sign of the second derivative, the "logic control" unit 24 selects either $F_{min}-F$, or $F_{max}-F$, or 0 as its output. As such:

If sign(F")=1, then output of the unit 24 is $F_{min}-F$;

If sign(F")=−1, then output of the unit 24 is $F_{max}-F$;

If sign(F")=0, then output of the unit 24 is 0.

The output of the "logic control" 24 unit is the correction signal R, which is then combined with the gain control function g at the node 30 (e.g., multiplier node). As such, the output of the node 30 is the adaptive correction signal AR based on the gain control function g, wherein the signal AR is combined with (e.g., added to) the original input signal F at the node 32 (e.g., summing node) to yield the enhanced signal output G.

The final output G of the system 10 can be expressed by example, as follows:

$G = F + g(|F''|)*(F_{min}-F)$ if $F''>0$;

$G = F + g(|F''|)*(F_{max}-F)$ if $F''<0$;

$G = F$ if $F''=0$;

wherein $g(|F''|)$ is the gain control function, which is a function of the absolute value of the second derivative F" as mentioned above.

Because $0 \leq g(|F''|) \leq 1$, then G can be represented as:

$G = F - g(|F''|)*(F-F_{min}) \geq F - 1*(F-F_{min}) = F_{min}$ if $F''>0$;

and $G = F + g(|F''|)*(F_{max}-F) \leq F + 1*(F_{max}-F) = F_{max}$ if $F''<0$.

This indicates that the input signal essentially will never be "pushed" below its local minimum or over its local maximum, whereby there is no undershoot no overshoot in the enhanced signal.

Figure 3:
FIG. 3 shows an effect of color transition enhancement according to the present invention.

FIG. 3 shows an example curve representing effect of color transition enhancement according to the present invention. The solid curve 34 represents the transition curve of the input chrominance signal F. Geometric properties of the second derivative F" dictates that the curve 34 is "concave up" wherever F">0 and that the curve 34 is "concave down" wherever F"<0.

Therefore, according to the above relations: (i) at the point where the curve 34 is "concave up" (F">0), the curve will be "pushed down" towards its local minimum by subtracting $g(|F''|)*(F-F_{min})$; and, (ii) at the point where the curve 34 is "concave down" (F"<0), the curve 34 will be "pushed up" towards its local maximum by adding $g(|F''|)*(F_{max}-F)$. The resulting curve 36 (indicated by the dotted line) is an enhanced chrominance signal with steep transitions, which does not exhibit undershoot or overshoot, according to the present invention. A such, the need for post-processing for overshoot/undershoot removal, is eliminated.

Figure 4:
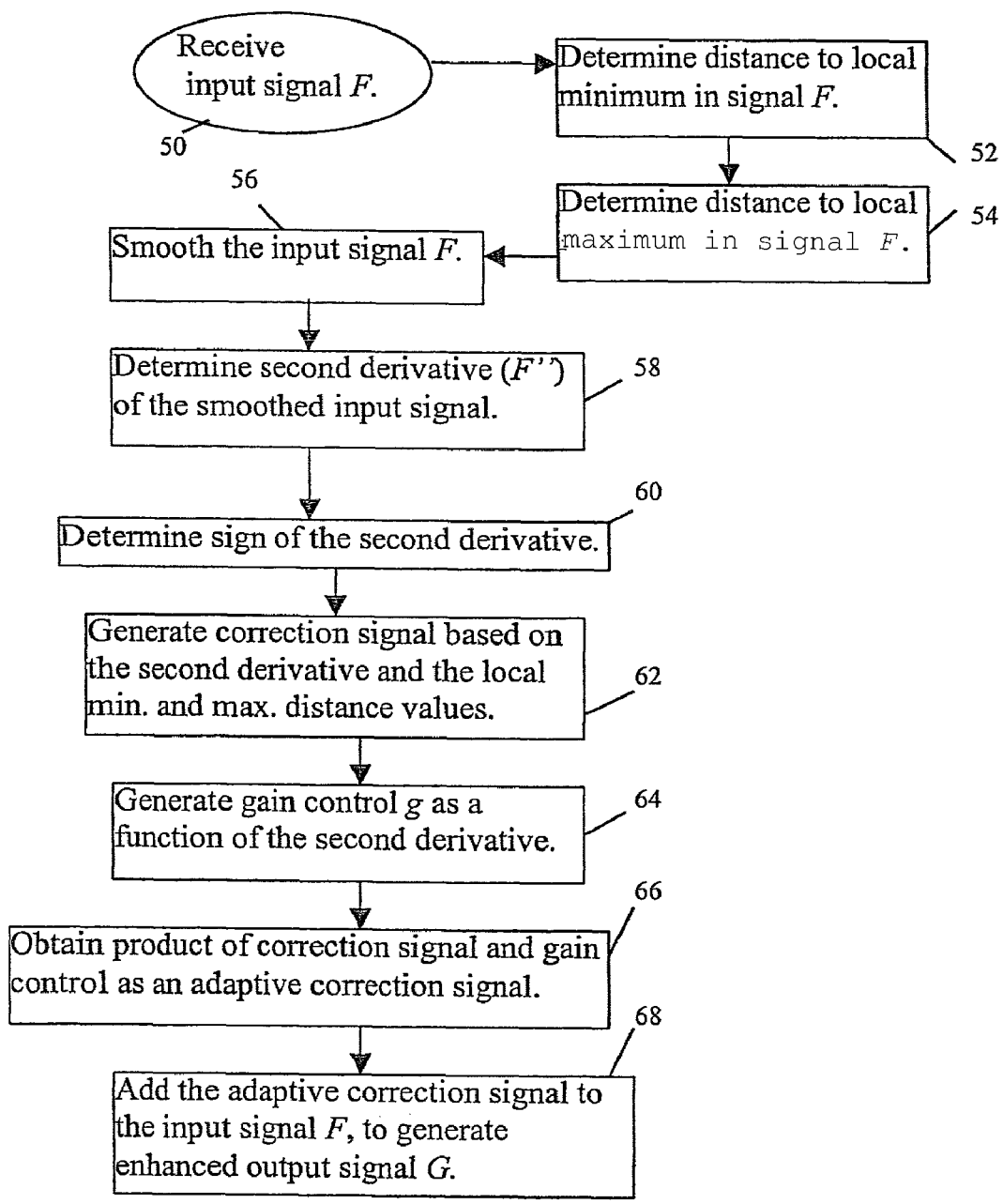
FIG. 4 shows an example flowchart of an embodiment of the steps of Transient Improvement technique according to the present invention.

FIG. 4 shows an example flowchart of the steps of CTI according to an embodiment of the present invention. After receiving the input signal F (step 50), the distance to local minimum and the distance to local maximum for the signal F are determined (steps 52, 54, respectively). The signal F is also smoothed in a low pass filter to obtain smoothed signal (step 56).

A second derivative F" of the smoothed signal is calculated (step 58), and the sign of the second derivative, sign(F"), is determined (step 60). Then, a correction signal is generated as a function of the second derivative and the local min. and max. distance values, wherein the correction signal controls transitions in the input signal (step 62). Further a gain control g is determined as a function of second derivative (step 64). The gain control and the correction signal are combined (e.g., multiplied) to obtain an adaptive correction signal (step 66), which is added to the input signal F, to generate the enhanced output signal G. Example details of a version of steps 50-68 were described in relation to FIG. 1 above.

The present invention further prevents noise accentuation. In the noisy image areas where there is no significant color transition, the second derivatives of the smoothed chrominance signals are very close to zero. Therefore, the gain control function, which is a function of the second derivative, is very close to zero in such areas. As such, the signals are barely changed in these areas, wherein the existing noise is not accentuated.

As such, the present invention provides a method of enhancing color transient of video signals. The method uses local image properties for adaptive gain control functions to control the gain of the color transient enhancement. In one example, the gain control function is represented by $g(|F''|) = |F''|/(C+|F''|)$. A logic block is used to compute the smooth second derivative of the input signal by using a Gaussian filter combined with a five tap band pass filter. The distance to local min/max is used as the correction signal for color transient improvement to avoid undershoot and overshoot. Further, the correction signal is selected based on the value (e.g., sign) of the smooth second derivative.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of processing an image, comprising:
   receiving an image chrominance signal F having a transient response; and
   employing a processor for adaptively enhancing chrominance transient of the signal F based on an adaptive correction signal that is a function of corresponding image characteristics of the transient response of the signal F, to obtain an adaptively enhanced signal G,
   wherein the corresponding image characteristics comprise local geometric properties of the transient response of the signal F;
   wherein adaptively enhancing chrominance transient of the signal F further includes:
      generating an adaptive correction signal AR for enhancing chrominance transient of the chrominance signal F, wherein the adaptive correction signal AR is a function of said corresponding image characteristics comprising local geometric properties of the transient response of the signal F, such that the local geometric properties are characterized by a second derivative of the chrominance transient response of the signal F; and combining the adaptive correction signal AR with the chrominance signal F to obtain said adaptively enhanced signal G.

2. The method of claim 1, wherein generating the adaptive correction signal AR further includes:

generating a correction signal R for enhancing chrominance transient of the chrominance signal F, wherein the correction signal R is a function of a local difference between the signal F and local image features of the transient response to the signal F; and adaptively controlling the correction signal R as a function of said local geometric properties of the transient response to the signal F to generate said adaptive correction signal AR.

3. The method of claim 1, wherein the local geometric properties are characterized by a second derivative of the chrominance transient response of the signal F.

4. The method of claim 1, wherein adaptively enhancing chrominance transient of the signal F further includes:

combining the adaptive correction signal with the chrominance signal F to obtain said adaptively enhanced signal G.

5. A chrominance signal processor, comprising:

an input that is configured to receive an image chrominance signal F having a transient response; and an adaptive enhancer that is configure to adaptively enhance chrominance transient of the signal F as a function of corresponding image characteristics of the transient response of the signal F, to generate an adaptively enhanced signal G, wherein the corresponding image characteristics comprise local geometric properties of the transient response of the signal F;

wherein the adaptive enhancer further comprises:

an adaptive correction signal generator that is configured to generate an adaptive correction signal AR for enhancing chrominance transient of the chrominance signal F, wherein the adaptive correction signal AR is a function of said corresponding image characteristics comprising local geometric properties of the transient response of the signal F, characterized by a second derivative of the chrominance transient response of the signal F; and a combiner that combines the adaptive correction signal AR with the chrominance signal F to obtain said adaptively enhanced signal G.

6. The signal processor of claim 5, wherein the adaptive correction signal generator further comprises:

a correction signal generator that is configured to generate a correction signal R for enhancing chrominance transient of the chrominance signal F, wherein the correction signal R is a function of a local difference between the signal F and local image features of the transient response of the signal F; and an adaptive controller that is configured to adaptively control the correction signal R as a function of said local geometric properties of the transient response of the signal F to generate said adaptive correction signal AR.

7. A method for processing an image, comprising:

receiving an image chrominance signal F having a transient response;

creating a smoothed signal F by passing said image chrominance signal F through a Gaussian filter;

calculating a distance to local minimum of said image chrominance signal F, said calculating said distance to local minimum comprising:

computing a local minimum $F_{min}$ by searching an interval of radius r centered at a current signal sample position of said image chrominance signal F; and subtracting said image chrominance signal F from said local minimum $F_{min}$;

calculating a distance to local maximum of said image chrominance signal F, said calculating said distance to local maximum comprising:

computing a local maximum $F_{max}$ by searching an interval of radius r centered at a current signal sample position of said image chrominance signal F; and subtracting said image chrominance signal F from said local maximum $F_{max}$;

calculating a second derivative F" wherein said calculating said second derivative F" receives as input said smoothed signal F;

calculating a sign of second derivative (F") wherein said calculating said sign of second derivative receives as input said second derivative F";

calculating a gain control g wherein said calculating said gain receives as input said second derivative F";

generating a correction signal R wherein said determining receives as input said sign of second derivative (F") and said distance to local minimum and said distance to local maximum;

generating an adaptive correction signal AR by combining said correction signal R and said gain control g;

producing an enhanced signal G by combining said adaptive correction signal AR and said image chrominance signal F; and sending said enhanced signal G to an output device.

8. A chrominance signal processor, comprising:

an input configured to receive an image chrominance signal F having a transient response;

a filter unit configured to receive said image chrominance signal F and configured to produce a smoothed signal F by passing said image chrominance signal F through a Gaussian filter;

a minimum calculator configured to receive said image chrominance signal F and configured to produce a distance to local minimum value;

a maximum calculator configured to receive said image chrominance signal F and configured to produce a distance to local maximum value;

a derivative calculator configured to receive said smoothed signal F and configured to produce a second derivative F";

a sign calculator configured to receive said second derivative F" and configured to produce a sign of second derivative (F");

a gain control configured to receive said second derivative (F") and configured to produce a gain g;

a correction signal generator configured to receive said sign of second derivative (F") and said distance to local minimum and said distance to local maximum, said logic control configured to produce a correction signal R;

an adaptive correction signal generator configured to produce an adaptive correction signal AR by combining said correction signal R and said gain control g; and an enhanced signal generator configured to produce an enhanced signal G by combining said adaptive correction signal AR and said image chrominance signal F.

* * * * *